US008700490B1

(12) United States Patent
Bhaktwatsalam et al.

(10) Patent No.: US 8,700,490 B1
(45) Date of Patent: Apr. 15, 2014

(54) METHOD, MEDIUM, AND SYSTEM FOR SELECTING ITEM IMAGES FOR ATTRIBUTES FROM AGGREGATED SOURCES (75) Inventors: Abhoy Bhaktwatsalam, Kirkland, WA (US); Jonathan J. McGee, Seattle, WA (US); Bobby P. Nath, Des Moines, WA (US); David M. Brown, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1576 days.

(21) Appl. No.: 11/617,998

(22) Filed: Dec. 29, 2006

(51) Int. Cl.
*G06Q 30/00* (2012.01)

(52) U.S. Cl.
USPC .................................................... 705/27.1

(58) Field of Classification Search
USPC ........ 705/26, 27, 14, 26.1, 26.61, 26.63, 27.1
See application file for complete search history.

(56) References Cited

U.S. PATENT DOCUMENTS

| | | | |
|---|---|---|---|
| 5,749,081 A | 5/1998 | Whiteis | |
| 6,064,980 A | 5/2000 | Jacobi et al. | |
| 6,115,717 A | 9/2000 | Mehrotra et al. | |
| 6,185,558 B1 | 2/2001 | Bowman et al. | |
| 6,266,649 B1 | 7/2001 | Linden et al. | |
| 6,317,722 B1 | 11/2001 | Jacobi et al. | |
| 6,366,910 B1 | 4/2002 | Rajaraman et al. | |
| 6,615,226 B1 | 9/2003 | Hartman et al. | |
| 6,731,309 B1 | 5/2004 | Unbedacht et al. | |
| 6,785,671 B1 | 8/2004 | Bailey et al. | |
| 6,853,982 B2 | 2/2005 | Smith et al. | |
| 6,912,505 B2 | 6/2005 | Linden et al. | |
| 6,963,848 B1 | 11/2005 | Brinkerhoff | |
| 7,016,865 B1 | 3/2006 | Weber et al. | |
| 7,050,992 B1 | 5/2006 | Bowman et al. | |
| 7,113,917 B2 | 9/2006 | Jacobi et al. | |
| 7,127,414 B1 | 10/2006 | Awadallah et al. | |
| 7,181,419 B1 * | 2/2007 | Mesaros | 705/26.2 |
| 7,203,675 B1 | 4/2007 | Papierniak et al. | |
| 7,266,514 B2 | 9/2007 | Herbert et al. | |
| 7,331,038 B1 | 2/2008 | Snodgrass et al. | |

(Continued)

OTHER PUBLICATIONS

Jul. 2006—https://web.archive.org/web/20060712105423/http://docs.smallbusiness.miva.com/en-US/merchant/4/webhelp/create_attribute_templates.htm.*

(Continued)

*Primary Examiner* — Matthew Zimmerman
(74) *Attorney, Agent, or Firm* — Knobbe, Martens, Olson & Bear, LLP (57) ABSTRACT

Systems and methods for presenting a user interface that shows a consolidated representation for an item available from multiple sources are described. The multiple offerings of the same items offered for sale by multiple sellers are combined into a simple user interface that is transparent to the consumer, but where the consumer can find an item and all of its attributes as though it was offered for sale by a single seller. The user interface can be created when a consumer selects an item, a list is generated of the sellers offering that item for sale, a list is generated of the various attributes of the item, a representation for each attribute is gathered, and an optimal representation for each attribute can be generated for display to the consumer when that attributed is selected by the consumer. The process for creating and modifying such a user interface can be automated or semi-automated, decreasing the manual intervention needed.

22 Claims, 8 Drawing Sheets

(56) References Cited

U.S. PATENT DOCUMENTS

| | | |
|---|---|---|
| 7,460,735 B1 | 12/2008 | Rowley et al. |
| 7,856,380 B1 | 12/2010 | Latin-Stoermer et al. |
| 7,945,484 B1 | 5/2011 | Tam et al. |
| 7,961,938 B1 | 6/2011 | Remedios |
| 2002/0010639 A1* | 1/2002 | Howey et al. .................. 705/26 |
| 2002/0038255 A1* | 3/2002 | Tarvydas et al. ............... 705/26 |
| 2004/0143600 A1* | 7/2004 | Musgrove et al. ......... 707/104.1 |
| 2004/0193591 A1* | 9/2004 | Winter .............................. 707/3 |
| 2005/0071242 A1* | 3/2005 | Allen et al. .................... 705/26 |
| 2006/0031123 A1* | 2/2006 | Leggett et al. ................. 705/26 |
| 2006/0059062 A1* | 3/2006 | Wood et al. .................... 705/35 |
| 2007/0073592 A1* | 3/2007 | Perry et al. .................... 705/26 |
| 2007/0168391 A1 | 7/2007 | Coschigano et al. |
| 2007/0168517 A1 | 7/2007 | Weller et al. |
| 2008/0154747 A1 | 6/2008 | Tarbell et al. |
| 2008/0177639 A1 | 7/2008 | Kuppersmith et al. |
| 2009/0007012 A1 | 1/2009 | Mandic et al. |

OTHER PUBLICATIONS

Endless.com, Endless Shoes & Handbags, http://www.endless.com [accessed Jan. 1, 2009], copyright 2006-2009, 3 pages.

Green, N., Deferred and Off-Loaded Rendering of Selected Portions of Web Pages to Incorporate Late-Arriving Service Data, U.S. Appl. No. 10/720,712, Nov. 24, 2003.

Quan et al., "A product-form aesthetic evaluation system", Computer-Aided Industrial Design and Conceptual Design, Nov. 2006, CAIDCD '06, 7th International Conference, pp. 1-6, 17-19.

Website for Gap Inc.—http//www.gap.com—Retrieved Dec. 19, 2010.

* cited by examiner

METHOD, MEDIUM, AND SYSTEM FOR SELECTING ITEM IMAGES FOR ATTRIBUTES FROM AGGREGATED SOURCES

FIELD

This application relates generally to the presentation of similar items available from multiple sources in a network-based environment. More specifically, this application relates to systems and methods for presenting a user interface that shows a consolidated representation for an item available from multiple sources in a network based environment.

BACKGROUND

Electronic commerce is an increasingly popular way of conducting business and selling items to customers. Customers are able to efficiently identify and purchase a wide variety of items, including both goods and services, over computer networks, including the Internet. The same goods and services can be offered by multiple sellers, each with its own conditions of sales (e.g., taxes, shipping charges, promotions, rebates, etc.), allowing a customer to quickly and easily select an item from a given seller with the desired sales conditions.

In many sales systems, individual small sellers come together under the umbrella of a larger seller and sell through the system of the larger seller. In such systems, however, a problem often arises of how to construct a user interface (UI) that can display to the consumer all of the items that are offered by the individual, smaller sellers. Where multiple individual sellers offer similar items of varying characteristics, the larger seller is faced with the decision of how to best display all of the items so that a consumer can quickly and easily choose the desired item.

Currently, one option has been to display every variation of every item from every seller. This option is distracting to the consumer because he is forced to filter through individual variations to determine which seller is selling which specific item. This process overburdens a consumer and in today's competitive market, the consumer will not likely take the effort to perform this process. Instead, the consumer will search and purchase the item in a different location.

There exist other problems that can be encountered by larger sellers displaying all the items being offered for sale by smaller, individual sellers. The UI strategies and methods used by the larger sellers are cumbersome and typically require manual input to monitor the information displayed about all of the various items in a timely manner. Indeed, it is not unusual for a larger seller to offer thousands of items at any given time. However, adjusting the UIs for each one require expensive time and manual effort. Such problems are compounded because new sellers are offering items for sale at an increasing pace.

SUMMARY

Systems and methods for presenting a user interface that shows a consolidated representation for an item available from multiple sources are described. The multiple offerings of the same items offered for sale by multiple sellers are combined into a simple user interface that is transparent to the consumer, but where the consumer can find an item and all of its attributes as though it was offered for sale by a single seller. The user interface can be created when a consumer selects an item, a list is generated of the sellers offering that item for sale, a list is generated of the various attributes of the item, a representation for each attribute is gathered, and an optimal representation for each attribute can be generated for display to the consumer when that attributed is selected by the consumer. The process for creating and modifying such a user interface can be automated or semi-automated, decreasing the manual intervention needed.

BRIEF DESCRIPTION OF THE DRAWINGS

The following description can be better understood in light of the Figures, in which.

Together with the following description, the figures demonstrate and explain the principles of the systems and methods for presenting a user interface that shows a consolidated representation for an item that is available from multiple sources. In the figures, the size and configuration of components may be exaggerated for clarity. The same reference numerals in different figures represent the same component.

DETAILED DESCRIPTION

The following description supplies specific details in order to provide a thorough understanding. Nevertheless, the skilled artisan would understand that the systems and associated methods of using the systems can be implemented and used without employing these specific details. Indeed, the systems and associated methods can be placed into practice by modifying the illustrated systems and methods and can be used in conjunction with any apparatus and techniques conventionally used in the industry. For example, while the description below focuses on systems and methods for providing a consolidated presentation of an item available from multiple sources in a network-based environment, it can be implemented in many other environments, such as in a buyer to buyer (b2b) network or a stand-alone computer environments and brick and mortar establishments that have a computerized system for browsing and selecting items via a network or within the establishment itself.

Figure 1:
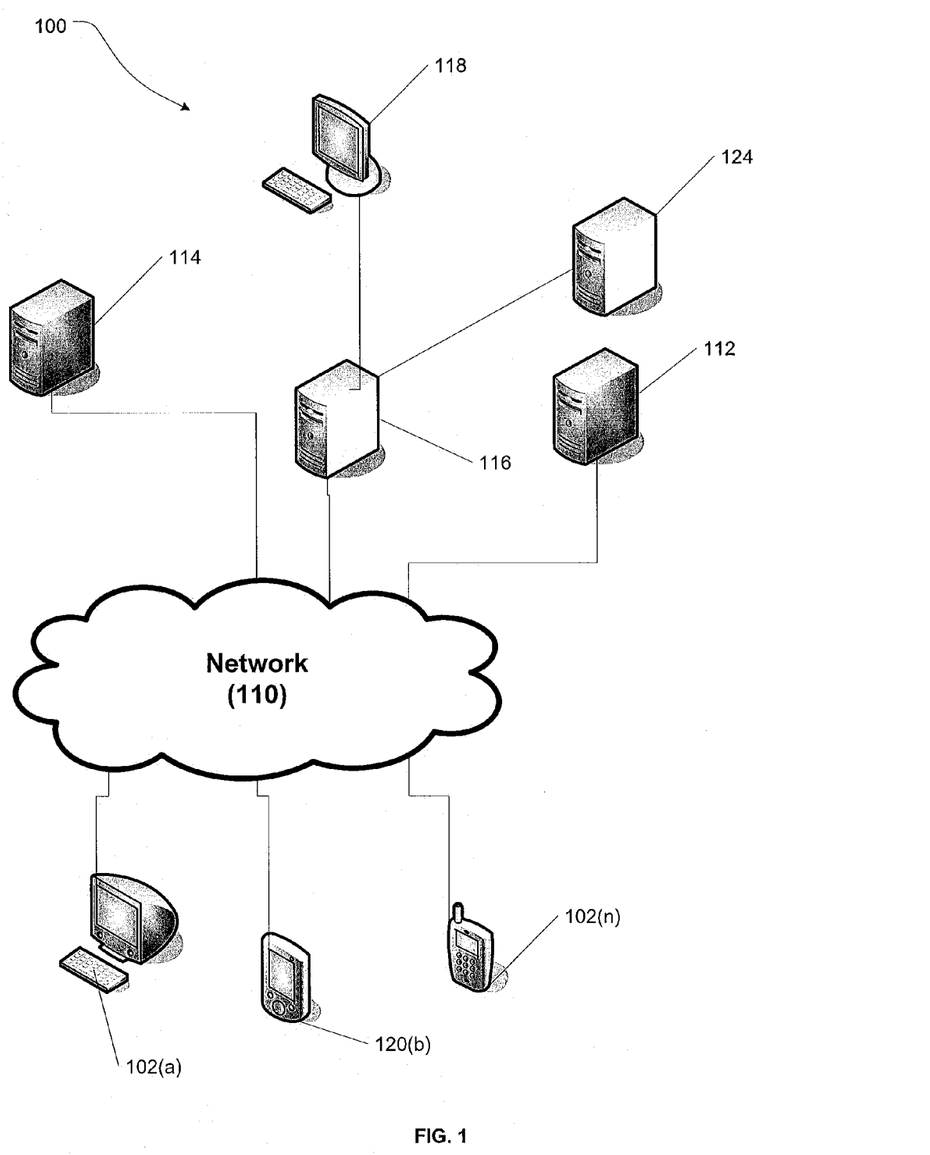
FIG. 1 contains a diagram illustrating a sample operating environment for implementing a method and system for presenting a consolidated presentation of an item that is available from multiple sources.

FIG. 1 is a diagram of a sample operating environment for implementing some embodiments of the present invention. FIG. 1 includes a system 100 for providing a consolidated presentation of an item that is available from multiple sellers. In FIG. 1, the system 100 contains a sales server 116 and a catalog server 124 that facilitate browsing and purchasing of items by a customer using any number or combination of customer devices 102(*a*), 102(*b*) and 102(*n*). The system 100 also contains a back-end interface 118 for a seller(s) to fulfill orders for any item(s) purchased by a customer using the customer devices.

Prior to discussing the details of system 100, it should be understood that the following description is presented largely in terms of steps and operations that may be performed by conventional computer components. These computer components, which may be grouped in a single location or distributed over a wide area, generally include computer processors, memory storage devices, display devices, input devices, etc. In circumstances where the computed components are distributed, the computer components are accessible to each other via communication links, such as those illustrated in FIG. 1. The system 100 could equally operate within a computer system having a fewer or greater number of components than those illustrated in FIG. 1. Thus, the depiction of system 100 should be taken as exemplary and not limiting. For example, the system 100 could implement various services components and peer-to-peer network configurations to implement at least a portion of the processes.

The customer devices 102(*a*)-102(*n*) may communicate with the sales server 116 and other devices via a computer network 110. Computer networks are well known in the field of communications. Computer networks may include communication links that extend over a local area or a wide area, or even be global, as in the case of computer networks forming the Internet. In some embodiments, computer network 100 comprises the Internet. Protocols and components for communicating via the internet are well known to those skilled in the art of computer communications and, thus, need not be described in more detail herein. Persons of ordinary skill in the art will recognize that other interactive environments that include local or wide area networks that connect sellers and customers for electronic commerce can be used in the system 100.

The customer devices 102(*a*)-102(*n*) can be any computing device that is capable of communicating over computer network 110. Examples of such computing devices include set-top boxes, personal digital assistants, wireless telephones, media players, web pads, electronic book readers, tablets, laptop computers, desktop computers, etc. In FIG. 1, the customer devices are depicted as a personal computer 102*a*, a personal digital assistant (PDA) 102*b*, and a wireless telephone 102*n*.

Figure 2:
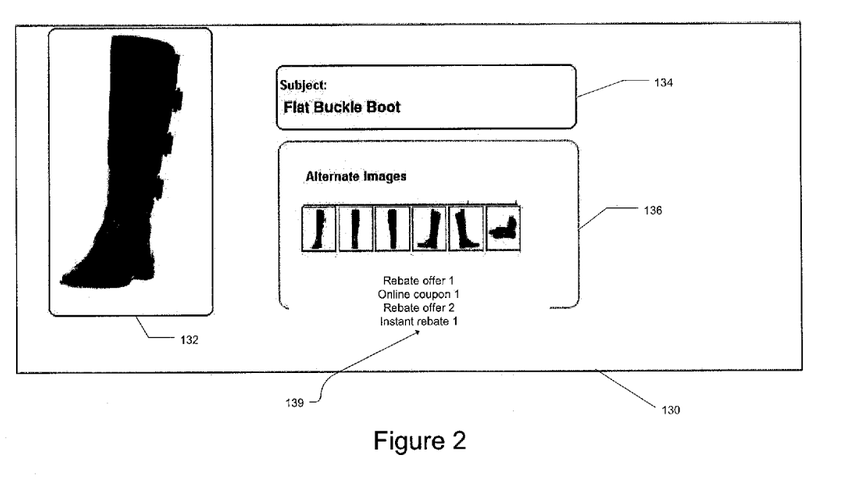
FIG. 2 contains a sample user interface for selecting and displaying an image in a network based environment.
Figure 6:
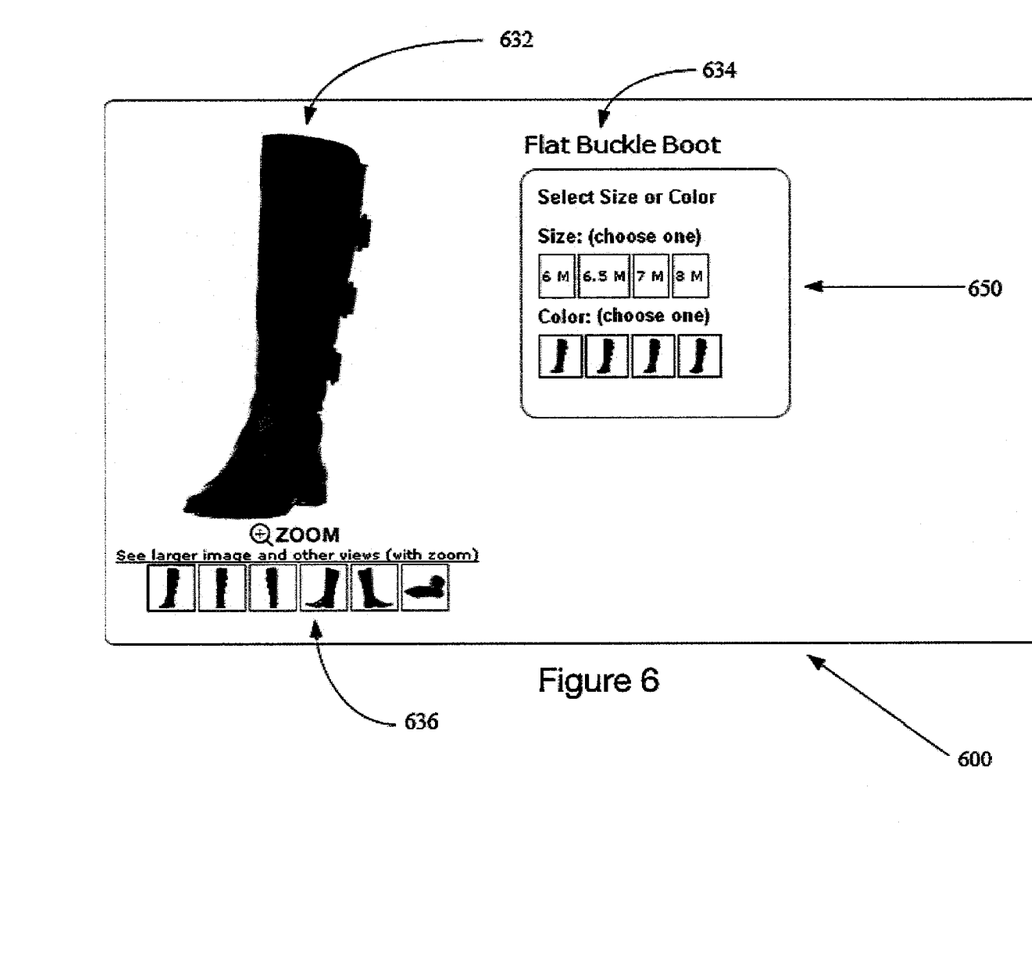
FIGS. 6-8 contain a graphic representation of a sample user interface for sequentially selecting and displaying a representation of the attributes of an item to obtain a best representation of an item that is available from multiple sources.
Figure 7:
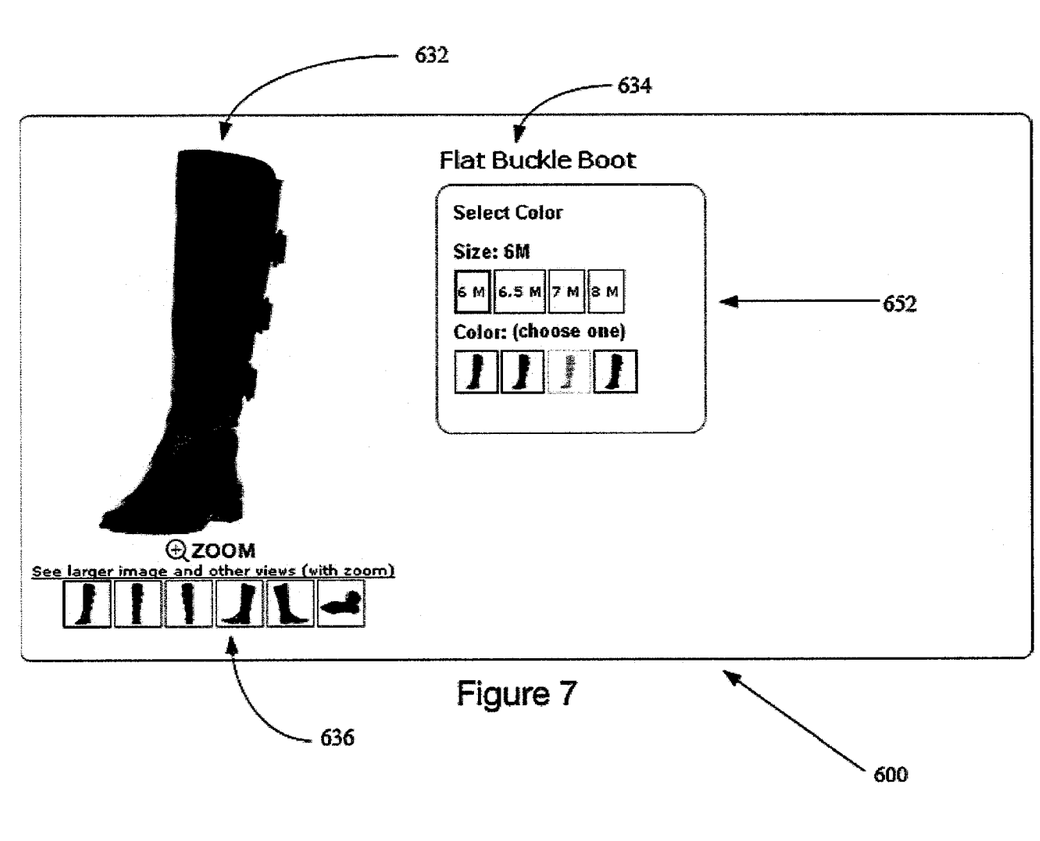

The sales server 116 is generally responsible for providing front-end communication with the customer devices such as devices 102(*a*), 102(*b*) and 102(*n*), via the network 100. This communication may include generating text and/or graphics, possibly organized as an interface using hypertext transfer or other protocols in response to information inquiries received from the various customer devices. Non-limiting examples of such user interfaces (UIs) are shown in FIGS. 2, 6 and 7. The sales server 116 makes the item information available to a customer or a plurality of customers via the customer devices. The customer (or customers) may then purchase items from a seller (or sellers) in a single transaction (or a series of transactions) with the system 100. The sales server 116 may also obtain and use information about the item for sale from the other servers in the system 100 to present to customers. For example, the sales server 116 may obtain information on available items directly from a catalog server 124, as in conventional electronic commerce systems.

The catalog server 124 is generally responsible for maintaining a comprehensive catalog of items that are available for browsing and possible purchase by users of the customer devices 102(*a*)-102(*n*). This catalog may be maintained in a conventional data store in one or more memory storage devices within the catalog server 124. In some embodiments, the catalog server 124 may be in communication with other servers and data stores also storing catalog information for the items available, i.e., servers and databases that are operated by different sellers.

The system 100 can also contain an item information server 112 that contains data about the various items being offered for sale. The data contained in server 112 includes all of those sources of those items, including sellers offering a particular item for sale. The data contained in server 112 also includes information about all of the attributes of the various items. These attributes includes the various features of the item, e.g., for a t-shirt the attributes may include the size and the color of the t-shirt. The item information server 112 can be updated in real time and may report a real time inventory of the various sources and various attribute information.

The system 100 can also contain an attribute representation server 114. The attribute representation server 114 contains a representation(s), whether graphical or textual, of each attribute for the numerous items that is contained in the item information server. The representation(s) could include any description of the attribute, for example, an image. The attribute representation server 114 can be updated in real time and may report in real time the various representations for any attribute needed to be displayed.

The systems described above can be used to carry out various methods for providing a consolidated, and in some embodiments, optimal presentation of an item available from multiple sources (e.g., sellers). For example, using the system 100 described above, multiple sellers may offer the same generic item (e.g., a Polo brand shirt) for sale via a retail site accessed via sales server 112. Although each seller may offer the same or substantially similar item, the item offered may vary in its attributes from those available from other sellers. Given the Polo brand shirt example, attributes for a Polo brand shirt may include size (S, M, L, XL) and color (yellow, blue, black, green and white.) Accordingly, different variations of the item may be available with different combinations of attributes from different sellers. For example, seller A may offer the polo shirt in sizes S, M and L and colors yellow and black, while seller B offers the polo shirt in sizes S, M and XL and colors white and blue in some embodiments. The systems and methods disclosed herein compile the variations of the item available from the different sellers and generate a consolidated presentation of the item in a common or single user interface. This presentation is opposed to generating and/or displaying each item available from each seller separately and in multiple user interfaces as is done conventionally.

Once a common user interface is presented for the generic item, the user may select an attribute for the generic item (e.g., size) and be presented with the other attributes (e.g., color) that are available, as well as the combination of attributes that would match a variation available from the sellers. Upon selection of the desired attributes (e.g., size L and color white) a representative image of a matching variation for the generic item may then be displayed. In some embodiments, those sellers that currently have available the matching variation(s) may also be displayed along with the sales conditions at which the seller is offering the item. In other words, the multiple items offered for sale by multiple sellers are combined into a simple user interface so that the consumer can find an item and all of its attributes as though it was offered for sale by a single seller.

FIG. 2 illustrates one example of a user interface (UI) that may be presented by the sales server 116. The UI in FIG. 2 depicts images of a fashionable woman's boot, but any item could be displayed by the UI. The UI 130 comprises a primary view area 132 for viewing the representation of the item (i.e., an image(s)). The UI 130 also contains a text portion 134, which is an area for a textual description or textual input. In FIG. 2, the subject of the image in the primary viewing area 132 can be textually described in the text portion 134. In some instances, the UI 130 may contain alternate viewing areas 136, which are areas containing images different from the image in the primary view area. Optionally, an area 139 may be provided for displaying sales conditions (e.g., price data, rebates, coupons, bundling options, shipping, etc.) for the displayed item. The skilled artisan would understand that the shapes and sizes of the various components in UI 130 could be changed as needed.

Figure 3:
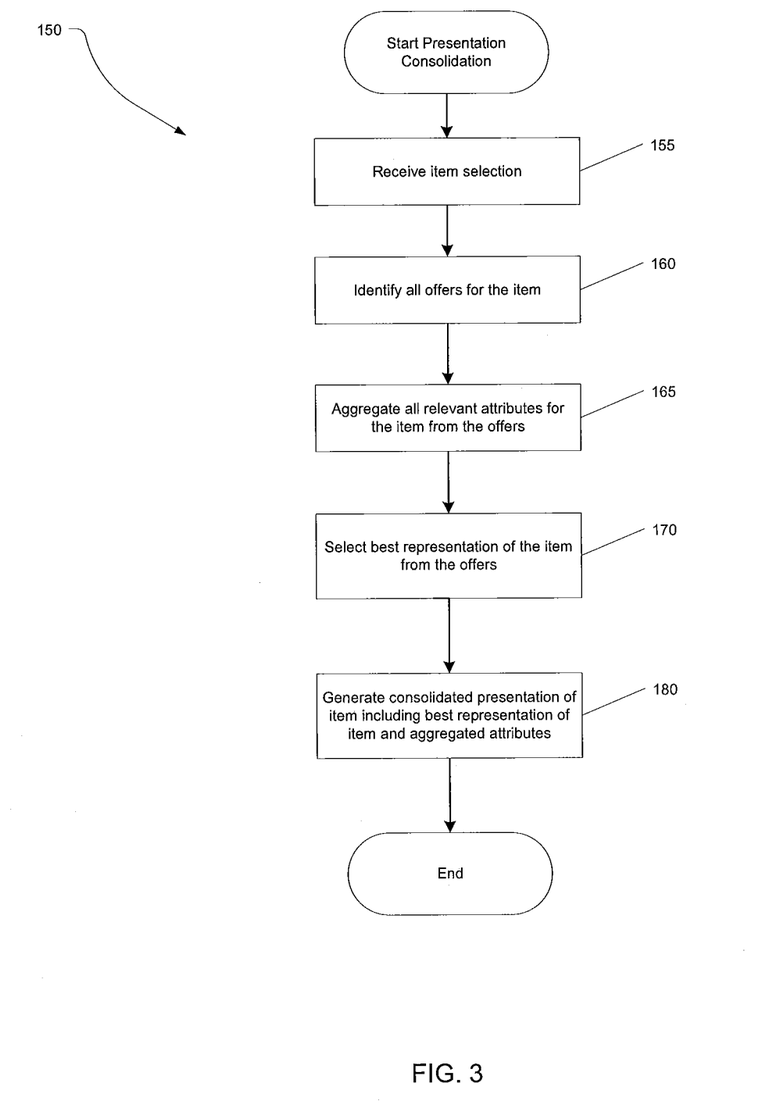
FIG. 3 contains a flow diagram illustrating a sample method for presenting a consolidated presentation of an item that is available from multiple sources.

The exemplary user interface in FIG. 2 can be created by any method that provides such characteristics, including the exemplary method 150 illustrated in FIG. 3. As depicted in FIG. 3, the method 150 begins when a consumer selects an item and the item selection is received by the sales server 116, as shown in block 155. The system then identifies all offers for the item from all of the various sources, as shown in block 160. An aggregation of all available attributes can be made in block 165 for all the offers identified in block 160. In block 170, a best representation of the item is selected from all of the offers. The best representation (i.e, image) may depend on seller strategies or other criteria determined by a user. Once the best image is selected in step 170, a consolidated presentation in block 180 is generated, including the selected best image and other aggregated representations from the various offers. The method 150 can be performed on automated or semi-automated basis.

The method 150 shown in FIG. 3 will be described in detail while referring to a particular item as an example to illustrate this method. The method 150 begins in block 155 when a customer selects a desired item (e.g., a Polo brand t-shirt) in block 155. This selection can optionally occur in two parts. If necessary, such as where the customer is not exactly sure of the specific item for purchase (e.g., he only knows that he wants some type of t-shirt), the customer can be prompted to select a category for the item (e.g., shirts). In the next part, the customer can be prompted to selected from among all the items listed in that category (e.g., Polo brand t-shirt, long-sleeve shirts, tank top, oxford shirts, etc.). Such a two-part process is not necessary where the customer knows the specific item he would like to purchase (e.g., the customer knows that he wants to buy a Polo brand T-Shirt).

In block 160, all of the offers for that item are identified. For example, information about each of the sellers offering a Polo brand T-Shirt is obtained. This seller information can optionally be filtered and then organized in any desired scheme, such as alphabetically, by size of the seller, numerically by the total numbers of items offered by the seller, or the like.

In block 165, the relevant attributes available for the item are then identified. For each attribute available in a Polo brand t-shirt, the attribute information is obtained. The number and types of attributes for the item will depend on the item selected. For example, for a Polo brand t-shirt, the attributes may include size (e.g., S, M, L, XL), color (e.g., black, white, red, blue), and material of manufacture (e.g., cotton, polyester, rayon). This attribute information can optionally be filtered and then organized in any desired scheme, such as alphabetically.

Once the sellers of, and attributes for, a selected offer are identified, representations for the attributes are aggregated in block 165. The type of representations that can be assembled will depend, in part, on the type of attributes and what sellers make available. Examples of the types of representations include textual, graphical, or images. In some embodiments, the type of representation used and displayed is an image since it can display a large amount of information quickly and easily for the display space needed. The number of representations assembled will depend on the number and type of attributes that are assembled, as well as the number of sellers that can provide a representation for that attribute. For example, seller A may only provide representations for black and white XL and M Polo brand T-shirts, seller B may provide representations for all combinations of colors and sizes, and seller C may provide no representations at all.

Once the representations are assembled, a best or optimum representation for any given attribute is selected in block 170. Such a process is not performed where there is only a single (or no) representation available for the attribute. An optimal representation may be determined automatically using a pre-selected set of criteria, or manually as desired. The image may also be selected randomly or semi-randomly. A single representation may be selected and generated for display or a set of representations showing different aspects of the attributes may be selected. An optimal set of representations may contain different perspective views and detail views of the attribute.

Next, in block 180, a consolidated presentation of the item, including the best representation of the item and the aggregated attributes, is then generated. When the customer selects the first attribute for the item, such as the size of the Polo brand T-shirt, the best representation for that attribute is then generated to the customer. As each successive attribute is selected by the customer, such as the size or material, the best representation for each attribute is sequentially generated. This process continues until there are no more attributes to select. Any number of attributes may be used and parsed through with each selection further narrowing the aggregation.

At this point, the desired combination of attributes has been selected by the customer. The result is a representation of the desired combination of attributes. For example, the customer has first selected black as the color of the Polo brand T-shirt, XXL as the size, and cotton as the material. Thus, the final representation that is generated is a black, XXL, cotton Polo brand T-shirt.

Optionally, the method 150 can then display the sellers that offer the final item for sale and each seller's conditions for sale of the final item. The type and number of conditions of sale can be customized so each seller's information lists information selected by him, which may or may not be the same as other sellers. For example, a first seller could list a discount available for him that is not available to other sellers. The type and number of conditions of sale can be standardized across sellers so that all sellers' conditions are the same. For example, if there are four sellers of a black, XXL, cotton Polo brand T-shirt, each sellers' information only contains the price, shipping and handling charges, and taxes.

From the customer's viewing perspective, the various steps in method 150 can be transparent because of the simplicity of the user interface of FIG. 2. In conventional methods for locating a desired item for purchase, large numbers of representations were displayed to the user because of the various combinations of attributes and sellers. For example, where there were five sellers of Polo brand T-shirts, 5 sizes (S, M, L, XL, & XXL), 5 colors (black, white, red, yellow, and blue), and 3 materials (cotton, polyester, and rayon), each combination of seller, size, color, and material (potentially 225 representations) might have to be displayed to the customer.

With the user interface of FIG. 2 presented to the customer, only a single representation (or where appropriate, series of representations) is displayed to the customer as the customer sequentially selects each attribute. Thus, once the customer selects a Polo brand T-shirt, he is prompted to select the first attribute (i.e., size) and only a single representation of the size is displayed. Once the customer selects the next attribute (i.e., color), only a single representation of the color is displayed. And when the customer selects the next attribute (i.e., material), only a single representation of the material is displayed. After final selection by the customer of the combination of attributes for the final item, the sellers offering the particular final item satisfying the selected combination of attributes are displayed. For example, it might be that only three sellers actually offer a black, XXL, cotton Polo brand T-shirt for purchase.

Figure 4:
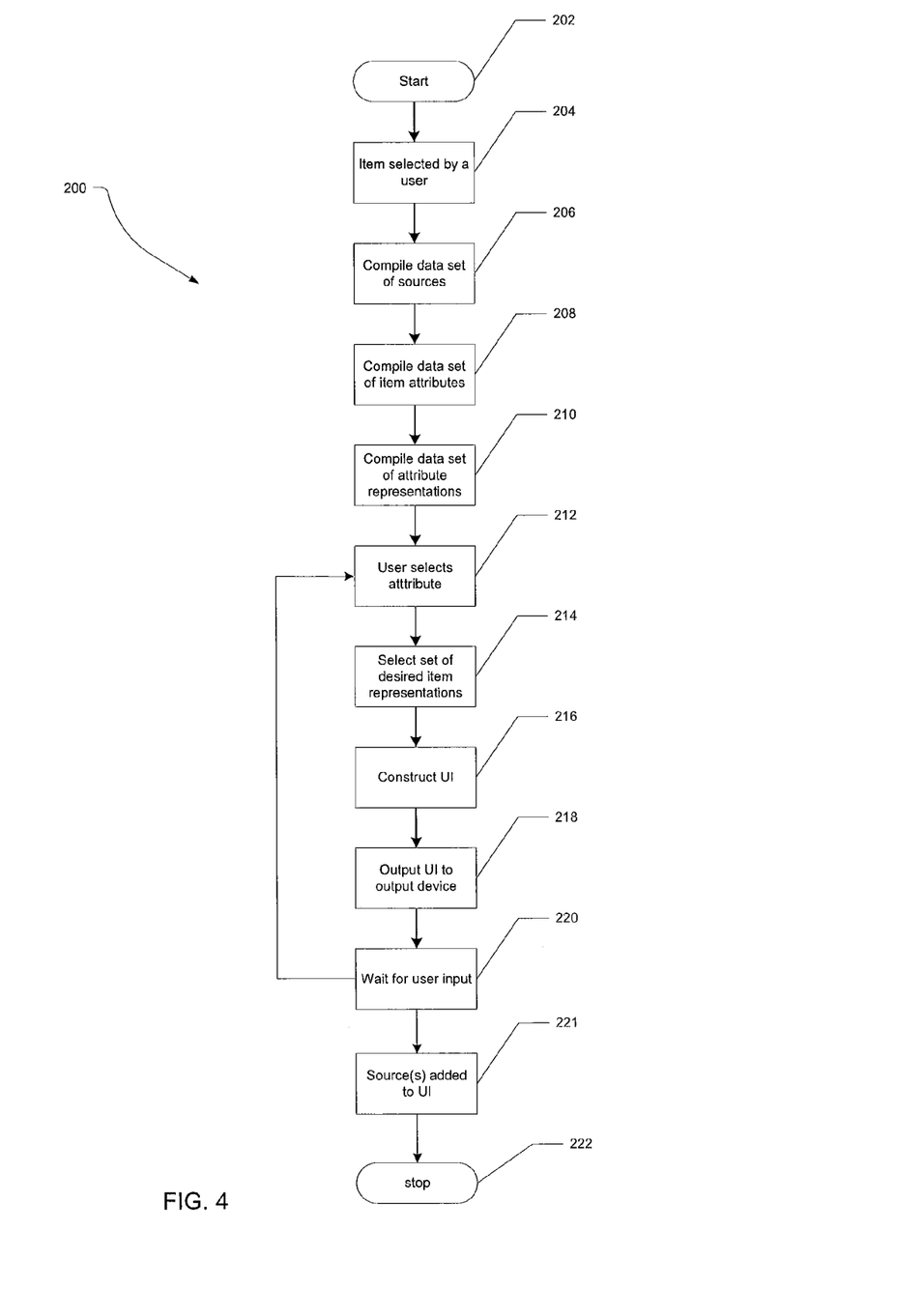
FIG. 4 contains a flow diagram of another sample method for presenting a consolidated presentation of an item that is available from multiple sources.

One exemplary method 200 for creating and using this simple UI is described in FIG. 4. Although the exemplary method 200 in FIG. 4 will be discussed in successive steps, it may be done in alternate orders and should not be understood as having to be performed in the described order below. Methods for presenting a consolidated presentation of items may include fewer or more steps that those depicted.

FIG. 4 illustrates an exemplary flow diagram of the method 200. The method 200 begins at block 202 and can be implemented by any computer executable code or computer executable commands and is referred to as the variation selection engine. The variation selection engine may be triggered automatically or may be triggered by a customer.

The method 200 continues when an item is selected (and optionally registered) by the customer as depicted in step 204. Optionally during this step, metadata can be associated with the item and made available for recall and use in the process. The method 200 continues at block 206 where a data set or sources for the selected item are compiled. The sources may be sellers or suppliers that have full or partial inventory for the item selected. The compiled data set can advantageously include every permutation or variation for the item that each source has in inventory.

An attribute data set is then created, as shown in block 208. The attribute data set may include all attributes of the item available from all participating sources. The attribute data set may be organized in any known manner, for example, in tabular form or by using any non-linear storage architecture.

A data set of the representations for the various item attributes is then compiled in block 210. The representation data set can be compiled from information internal and/or external to the system 100 described above. While this data set may be compiled manually, it can also be compiled automatically or semi-automatically. The data set can be organized in any manner known in the art, including based on the different types of representation (text, graphical, etc. . . . ) in the data set.

Optionally, a determination can be made as to the completeness of the representation data set. A complete set may be a set containing all expected views of the item, or the views may be only certain desired views (e.g., top, bottom and only one side). Also, the views may depict only certain aspects of the attributes of the item. The determination of the completeness may be accomplished manually or automatically. This determination may also be made substantially on a real time basis as the customer interacts with the system.

As shown in block 212, the user then selects the desired attribute for the item from among all of the attributes that have been compiled in block 208. For example, if three item attributes have been compiled in block 208 (e.g., color, size, and material), the user will select one of those attributes (e.g., color) in block 212. Typically this selection occurs when the customer selects that attribute of the item to view.

A best representation of the selected item or item attribute is then selected for display in block 214. With the possibility of multiple representations, including images, competing to be displayed, it may be necessary to select a single, optimal representation from among the data set. A single image, or a set of images, may be selected and displayed and may show different perspective views and/or detail views.

The data and information from blocks 206, 208, 210, 212, and 214 are then used to create the user interface (UI) in block 216. The UI can be constructed from the data in any way that provides a representative description of the item and attributes chosen by the customer as described above. The UI can change as attributes are selected and the available item variations diminish in number. In some embodiments, a single item representation, with an accompanying image and description, can be the result of the process performed by variation selection engine.

Once the UI is generated, it may optionally be displayed to a customer in block 218. Generation of the UI 216 may include consideration of the display type and size. For example, a personal data assistant (PDA) has a relatively small display area when compared to a computer monitor. To offer an optimal UI for a PDA, it may require different parameters then a larger sizes computer monitor. Thus, the UI may be modified to allow for different display configurations.

After the UI is output to the customer, the method 200 may wait for further input from the customer in block 220. This further input can be useful to either further narrow the results or make a final selection regarding the item. The final selection may be a choice to cancel the purchasing process for the item. Additionally, a choice may be provided to the customer to modify any previous selection of the item or any given attribute.

When additional attributes need to be considered by the customer, the method 200 returns to block 212 so that the customer can select additional attributes. This loop continues until all the attributes desired by the customer have been selected. For example, when the three attributes mentioned above (color, size, and material) have been compiled in block 208, the customer selects one of those attributes (e.g., color) for the method 200 to proceed. If the customer desires to view the other attributes (size and/or material), the method 200 loops back to block 212 so the customer can view other desired attribute(s).

After all of the desired attributes have been selected by the customer, the UI contains the final representation of the item containing all of the desired attributes. At this point, a list of all sellers of the item—and each seller's associated sales conditions—can optionally be displayed in the UI as shown at block 221. In certain instances, one or more sellers can be given a preference for being displayed in the UI. Any known evaluation can be made automatically or manually as to which seller will be given preference (and in which order if more than one seller is selected). This evaluation may include a contractual selection process or a bidding selection process that may be instituted among the various sellers competing for the advantage of being listed as the preferred seller.

The method 200 may be stopped at block 222. Stopping the system may be done automatically or manually. In some embodiments, the method 200 may be stopped during any of the steps listed above and, if desired, may be restarted at any point in the process. One result of method 200 can be a user interface showing the customer the final item in a main view, with other selectable views in secondary views, i.e., the alternate views shown in area 136 of FIG. 2, and the sellers offering that final item for sale.

The method 200 above can be better understood with an example of how it can be used to generate a consolidated presentation of a specific item for sale by multiple sellers. Such an example is contained in FIG. 5, which contains a flowchart depicting a method 400 of finding a black Polo brand T-shirt. The method 400 begins at block 402 and continues in block 403 when all colors of Polo brand T-shirts can be compiled since it is known that the item of interest is a particular color (e.g., black) of Polo brand T-shirt. The method continues in block 404 when the item of interest (a black Polo brand T-shirt) is selected from among all of the colors of the Polo brand T-shirts that have been compiled in block 403. The method continues when the customer selects a black Polo brand T-shirt, as shown in block 404. If desired, the black Polo T-shirt can be optionally registered, either automatically or manually by the customer. Next, a data set of sources (sellers or suppliers) that have at least one black Polo brand T-shirt for sale is compiled, as shown at block 406.

Figure 5:
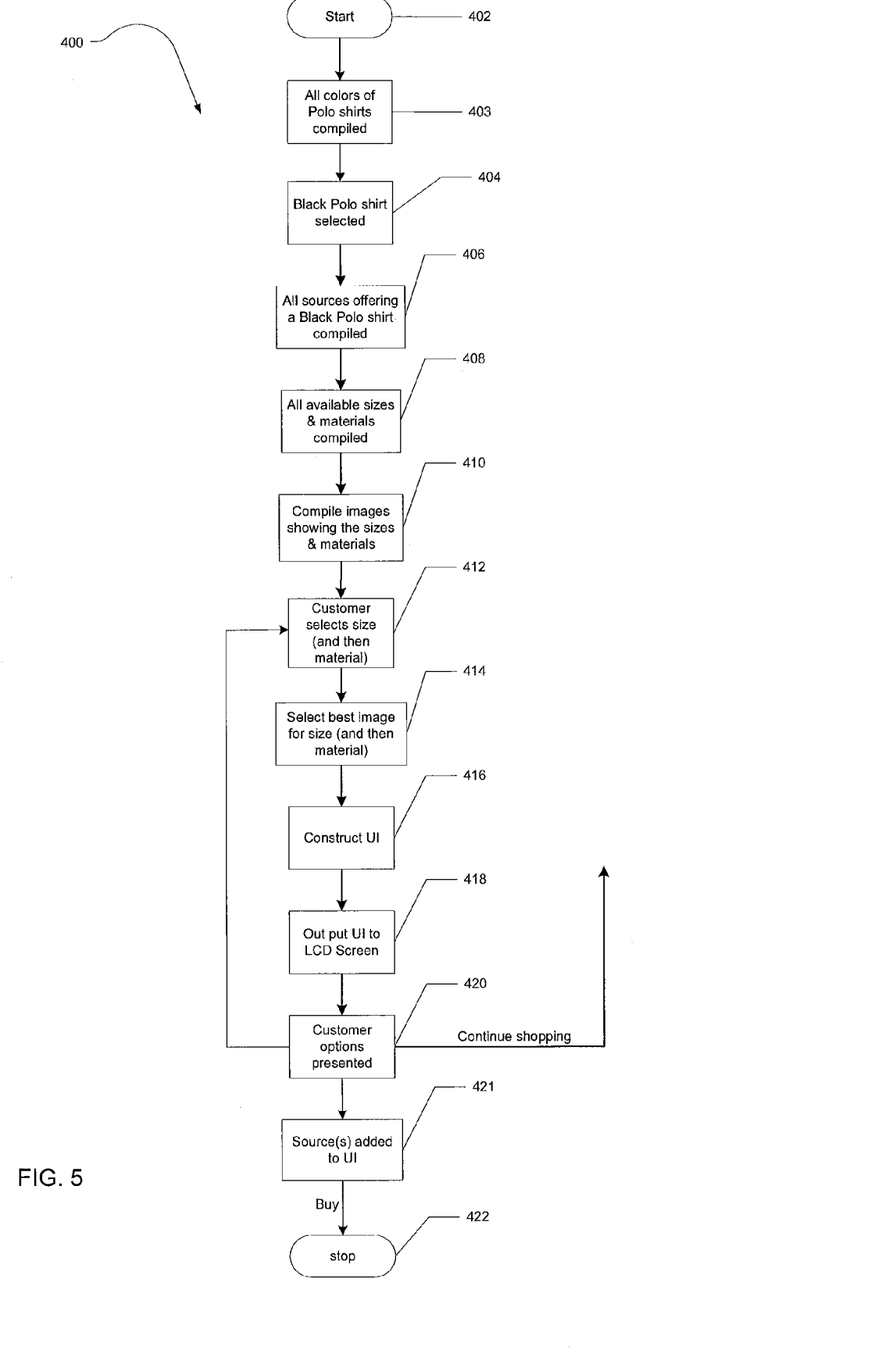
FIG. 5 contains a flow diagram of yet another sample method for presenting a consolidated presentation of an item that is available from multiple sources.

An attribute data set for a black Polo T-shirt is then created in block 408. The data set may include all sizes and all materials available from all participating sources for that T-shirt. The data set could be organized primarily by size (S, M, L, XL, XXL, . . . ) and then secondarily by material (cotton, polyester, rayon, . . . ).

A data set of the representations (e.g., images) for the attribute data set (e.g., size and materials) is then compiled in block 410. This data set can be compiled automatically from any available information, including the sellers themselves. The images can be organized in any manner known in the art, including size or resolution of the image files.

As shown in block 412, the customer then selects the desired attribute for the black Polo T-shirt from among those attributes that are available. Since only size and material are the only available attributes in method 400, the customer will select one of those attributes. For purposes of illustration in method 400, it has been assumed that the customer has selected the size first (and then will later select the material).

An optimal representation of the black Polo T-shirt with this size is then selected for display in block 414. With the possibility of many available images to show for a black Polo T-shirt, it may be necessary to select an optimal representation from among all of the images. In this example, size may not be an attribute readily recognizable for image selection purposes because without some relative measure, a S black Polo T-shirt can look the same as an XL black Polo T-shirt. An example of an optimal image could be a black Polo T-shirt shown on a model or mannequin, with detail pictures of the buttons and collar may also be shown.

A single UI is then constructed at block 416 to provide a representative description of the black Polo T-shirt chosen by the customer for the size that has been selected. For example, extended sizes may be offered and selected to further refine the images displayed to the customer in the UI.

The UI is then optionally displayed to the customer in block 418. The UI may include an area for a primary representation of the black Polo T-shirt. Because of the limited space of a PDA display being used by a customer, alternate views may be textually described with hyper text links, selection of which displays the alternate views.

The customer's selection of different options in block 420 determines how method 400 proceeds. In one option, the customer has decided to purchase the final selected item without desiring to look at any more attributes, e.g., the customer does not need to view the material to make the purchase. In this option, the method 400 then proceeds to block 421. If the customer chooses the option of viewing another attribute, e.g., the material of the black Polo T-shirt, the method 400 returns the customer to block 412 where the customer then selects the desired material. The method then continues with a new UI containing a new representation that not only depicts the size, but also depicts the selected material. In another option, the customer decides to continue shopping. In this option, the method 400 awaits the selection of a new item by the customer, or depending on the stage of the purchasing process, to any other appropriate part of the method 400.

After all of the desired attributes have been selected by the customer, the UI contains the final representation of the black Polo T-shirt containing all of the desired attributes (size and/or material). At this point, a list of all sellers of the black Polo T-shirt—and each seller's associated sales conditions—can optionally be displayed in the UI as shown at block 421. When desired, a preference can be given to a given seller at block 421. For example, a seller C could be automatically given preference over sellers A and B because seller C lists more black Polo T-shirts in the data sets than seller A or B.

The method 400 may be stopped in block 422 after a customer purchases the final selected item. As well, the method may be stopped during any of the steps listed above and may be restarted at any point in the process depending on the actions of the customer.

The UI described above displays a consolidated presentation of an item offered for sale by multiple sellers in a simple, transparent interface that allows a consumer to find an item as though it was offered for sale by a single seller. But the UI can also be adapted, if desired, to be used by an operator of the systems described above.

Figure 8:
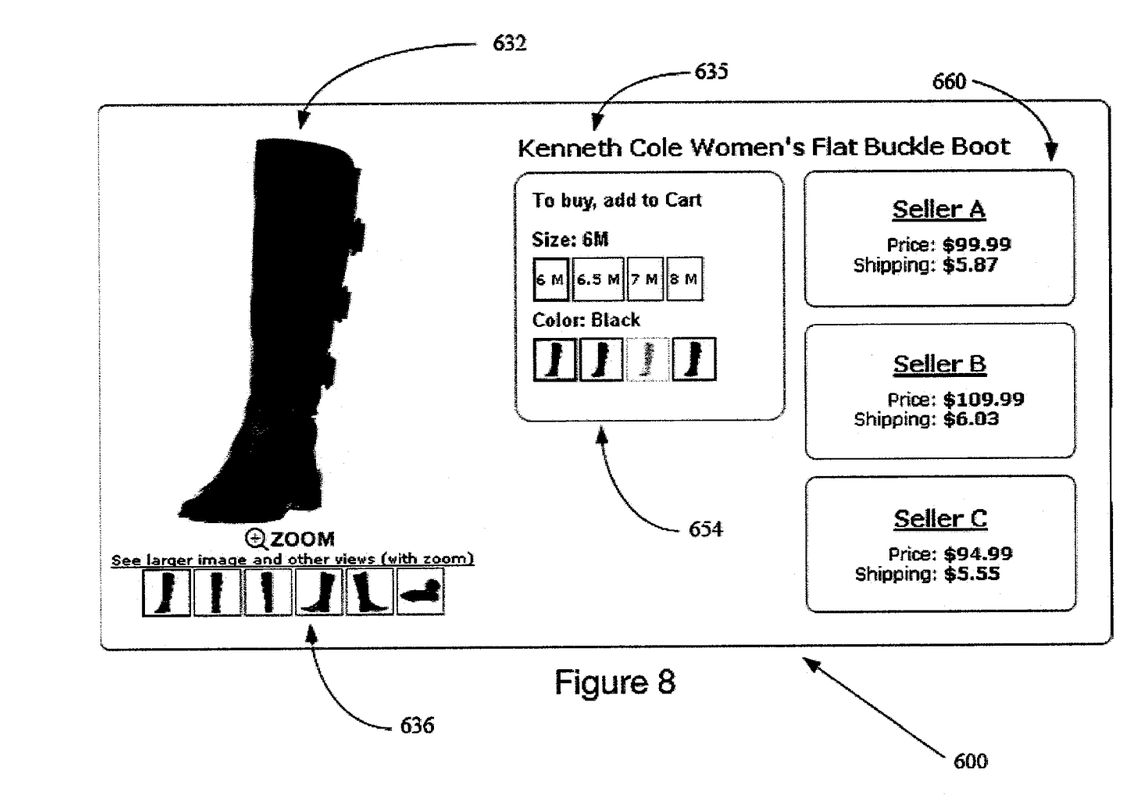

FIGS. 6-8 illustrate how the UI might change as the customer sequentially selects the attributes for an item. The UIs in FIGS. 6-8 can be displayed in any network resource of the system 100, such as a web page or as a stand alone display. Like FIG. 2, FIGS. 6-8 depict the UI for a customer looking to purchase a woman's flat buckle boot.

Similar to the UI described in FIG. 2, FIG. 6 depicts a UI containing a representation (an image or set of images), but displayed in the context of a web page 600. The web page 600 contains the primary viewing area 632 with a primary view of an image for the desired item, an alternate viewing area 636 with alternate views of the image, and a text portion 634. If desired, the web page 600 may also contain any of the fields and sections known in the art.

The UI depicted in FIG. 6 also contains attribute area 650. In this area, the customer is prompted to select a first attribute for the depicted item. In FIG. 6, that attribute can be either the various sizes or the color. Once the customer selects the first attribute (e.g., the size), the image in primary viewing area 632 might change to depict to the selected size. For example, the image in primary viewing area 632 might change to show the size on a foot of a model, or text might be added to the text portion 634 to designate the size selected.

Once this first attribute has been selected and the image changed accordingly, the UI is modified similar to that shown in FIG. 7. The attribute area is changed to now designate the specific size (e.g., 6M) that has been selected (by highlighting the box containing that size). The attribute area also gives the customer the ability to select the second attribute. As shown in FIG. 7, the attribute area 652 now gives the customer the option to select the second attribute, the color of the item. FIG. 7 also illustrates the impact of the selection of the first attribute (size of 6M) can have on the second attribute because, for example, the third color choice (green) is unavailable in the selected size of 6M. Once the customer selects the color (e.g., black), the image in the primary viewing area 632 can change to depict the selected color (e.g., black) and the box containing that color has been highlighted to show the selection.

This attribute selection occurs sequentially, so that the attribute area changes to show the attribute under consideration and the options for that attribute. And as each attribute is selected, the image in the primary viewing area 632 and/or the text in the text portion 634 might be updated to reflect the option that has been selected.

The attribute selection process by the customer can continue until all the attributes for the item have been selected. At that point, the best representation of the item in the primary viewing area 632 and/or the text portion 634 is displayed. For example, in FIG. 8, the best image for a black boot with a size of 6M is shown in the UI and the text portion (now 635) can be optionally updated to describe the final item selected by the customer, a black Kenneth Cole Women's Flat Buckle Boot (optionally with a designation of a size of 6M). In other instances, though, the text portion need not be changed to specify the exact brand of boot. The attribute area (now 654) can also show each attribute and the option that has been selected by the customer by the use of highlighted boxes.

At this point, the UI can also contain the various sources (i.e., sellers) from which that item is available, along with the sales conditions of the item that each seller is offering. In FIG. 8, the various sellers (A, B, and C) and their sales conditions are shown in area 660. The customer can then, if desired, select one of those sellers from which to purchase the item.

A limited number of sections are depicted in FIGS. 6-8 for purposes of clarity. But additional sections or fields, may be employed as needed. For example, additional sections could include search fields, purchase fields, etc. As well, depending on the size and format of the device used by the customer, the UI will take various forms and may have more or fewer sections in order to fit the display of that customer device.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

We claim:

1. A method comprising:
receiving a selection of an item by a customer;
retrieving information from a plurality of sellers having offers for the item;
identifying a plurality of attributes for the item;
aggregating a plurality of representations for the item based at least in part on the information from the plurality of sellers and the plurality of attributes, wherein the plurality of representations includes one or more images for the item;
selecting, by a computer processor, a first representation image for a first attribute from the plurality of attributes to represent the first attribute, wherein the first representation image is selected from the aggregated plurality of representations based upon a first predetermined set of criteria for the first attribute;
selecting, by the computer processor, a second representation image for a second attribute from the plurality of attributes to represent the second attribute, wherein the second representation image is selected from the aggregated plurality of representations based upon a second predetermined set of criteria for the second attribute, wherein the second attribute is different from the first attribute; and
generating a presentation of the item for sale for the customer, wherein the presentation includes at least the first and second representation images.

2. The method of claim 1 further comprising receiving a selection of an item before retrieving the information from the plurality of sellers.

3. The method of claim 1 further comprising making the first and second representation images available for display in a network environment.

4. The method of claim 1 further comprising:
displaying the first and second representation images;
displaying a list of sellers offering the item; and
displaying conditions of sale of the item for each seller.

5. The method of claim 1, wherein the first predetermined criteria and the second predetermined criteria comprise color matching information for depicting images associated with a substantially similar color.

6. The method of claim 5, wherein the first representation image and the second representation image depict the item in the substantially similar color.

7. The method of claim 1, wherein at least on of the first representation image and the second representation image depict a perspective view representative of the item.

8. The method of claim 7, wherein the first representation image and the second representation image depict different perspective views representative of the item.

9. The method of claim 7, wherein the perspective view includes at least one of a top view, a front view or a side view.

10. A non-transitory computer-readable medium containing computer executable code, wherein the computer executable code when executed by a computing system causes the computing system to:
receive a selection of an item by a customer;
retrieve information from a plurality of sellers having offers for the item;
identify a plurality of attributes for the item;
aggregate a plurality of representations for the item based at least in part on the information from the plurality of sellers and the plurality of attributes, wherein the plurality of representations includes one or more images for the item;
select a first representation image for a first attribute from the plurality of attributes to represent the first attribute, wherein the first representation image is selected from the aggregated plurality of representations based upon a first predetermined set of criteria for the first attribute;
select a second representation image for a second attribute from the plurality of attributes to represent the second attribute, wherein the second representation image is selected from the aggregated plurality of representations based upon a second predetermined set of criteria for the second attribute, wherein the second attribute is different from the first attribute; and
generate a presentation of the item for sale for the customer, wherein the presentation includes at least the first and second representation images.

11. The computer-readable medium of claim 10, wherein the computer executable code further causes the computing system to display a list of sellers offering the selected item for sale and the condition of each offer for each seller.

12. The computer-readable medium of claim 10, wherein the first predetermined criteria and the second predetermined criteria comprise color matching information for depicting images associated with a substantially similar color.

13. The computer-readable medium of claim 12, wherein the first representation image and the second representation image depict the item in the substantially similar color.

14. The computer-readable medium of claim 10, wherein at least on of the first representation image and the second representation image depict a perspective view representative of the item.

15. The computer-readable medium of claim 14, wherein the first representation image and the second representation image depict different perspective views representative of the item.

16. The computer-readable medium of claim 15, wherein the perspective view includes at least one of a top view, a front view or a side view.

17. A computer-implemented system comprising:
a data store configured to store a plurality of items from multiple sellers; and
a computer processor in communication with the data store that is configured to execute computer-executable instructions that cause the computer processor to:
receive a selection of an item by a customer;
retrieve information from a plurality of sellers having offers for the item from the data store;
identify a plurality of attributes for the item;
aggregate a plurality of representations for the item based at least in part on the information from the plurality of sellers and the plurality of attributes, wherein the plurality of representations includes one or more images for the item;
select a first representation image for a first attribute from the plurality of attributes to represent the first attribute, wherein the first representation image is selected from the aggregated plurality of representations based upon a first predetermined set of criteria for the first attribute;
select a second representation image for a second attribute from the plurality of attributes to represent the second attribute, wherein the second representation image is selected from the aggregated plurality of representations based upon a second predetermined set of criteria for the second attribute, wherein the second attribute is different from the first attribute; and
generate a presentation of the item for sale for the customer, wherein the presentation includes at least the first and second representation images.

18. The computer-implemented system of claim 17, wherein the first predetermined criteria and the second predetermined criteria comprise color matching information for depicting images associated with a substantially similar color.

19. The computer-implemented system of claim 18, wherein the first representation image and the second representation image depict the item in the substantially similar color.

20. The computer-implemented system of claim 17, wherein at least on of the first representation image and the second representation image depict a perspective view representative of the item.

21. The computer-implemented system of claim 20, wherein the first representation image and the second representation image depict different perspective views representative of the item.

22. The computer-implemented system of claim 20, wherein the perspective view includes at least one of a top view, a front view or a side view.

* * * * *

UNITED STATES PATENT AND TRADEMARK OFFICE
CERTIFICATE OF CORRECTION

PATENT NO. : 8,700,490 B1
APPLICATION NO. : 11/617998
DATED : April 15, 2014
INVENTOR(S) : Bhaktwatsalam et al.

Page 1 of 1

It is certified that error appears in the above-identified patent and that said Letters Patent is hereby corrected as shown below:

In the Claims

In Column 12, Line 30, Claim 7, Change sentence "at least on of the" to --at least one of the--.

In Column 13, Line 11, Claim 14, Change sentence "at least on of the" to --at least one of the--.

In Column 14, Line 27, Claim 20, Change sentence "at least on of the" to --at least one of the--.

Signed and Sealed this
Twenty-third Day of September, 2014

Michelle K. Lee
*Deputy Director of the United States Patent and Trademark Office*